Sept. 30, 1941. S. S. BERNSTEIN 2,257,367

WIRE SPRING

Filed June 24, 1938

Inventor

Samuel S. Bernstein

By [signature]

Attorney

Patented Sept. 30, 1941

2,257,367

UNITED STATES PATENT OFFICE 2,257,367

WIRE SPRING

Samuel S. Bernstein, Beverly Hills, Calif.

Application June 24, 1938, Serial No. 215,627

3 Claims. (Cl. 155—179)

This invention relates generally to wire springs, particularly that class of springs which have been termed flat springs.

Flat springs are ordinarily made of wire which has been bent to a sinuous shape. Such springs are used generally in upholstery for backs or seats, flat cushions, cushion seats and the like are usually secured in place with a slight longitudinal curve. Ordinarily only the ends of the spring are secured and the spring is free to be bent beyond the plane of support. When bent beyond the plane of support, springs of the ordinary type with which I am familiar, become less stiff and less able to resist the force against them. Some springs even fail to recover their original position if forced considerably beyond the plane of support. It is also true that the ordinary type of flat wire springs are not particularly stable against lateral displacement.

Therefore, it is an object of this invention, to provide a flat wire spring of simple form and construction which is stiffer than the ordinary flat spring of equal size. It is also an object of this invention to provide a flat spring which becomes increasingly stiff as it is bent beyond the plane of support and which will very readily regain its original position when the force acting upon it is removed.

It is also an object of this invention to provide a flat wire spring of simple form and construction which is more resistant to lateral displacement than the ordinary type of spring and which is relatively stable in this respect.

It is a further object of this invention to provide a flat wire spring which is formed of less material than other types of flat wire springs of equal strength made from like material having the same temper.

Ordinary flat springs formed of wire having lateral undulations pinch the upholstery which they support when the springs are bent. This is due to the fact that the entire weight or force upon the upholstery is carried on the working or movable parts of the spring, the result being that the cloth or other material bearing upon the spring is pinched and tends to wear out quickly. The padding material of the upholstery also tends to become pinched into bunches, making an uneven and uncomfortable support for the user. In this connection, where ordinary flat spring having a series of lateral U-shaped undulations are used, it has been found necessary to use a relatively thin layer of padding material in the upholstery in order to prevent the padding from working into the spaces between the undulations of the spring and thereby preventing the springs from functioning. When only a relatively small amount of filling or padding is used the layer of material adjacent the spring soon wears out due to the fact that there is not enough padding to effect a proper cushioning of the forces brought to bear on the upholstery.

In view of the above disadvantages of the ordinary type flat spring, it is a further object of this invention to provide a flat wire spring which is designed to prevent undue wear of the cloth, padding, and other upholstery material with which it is associated, by providing a spring which has less pinching effect upon the material with which it is associated than the ordinary type of flat wire spring. In this connection it is an object of this invention to provide a flat spring having curved portions adapted to bear against the upholstery and support the major proportion of the load and having flat flexible portions intermediate the curved portions which are adapted to move relatively freely of the upholstery.

It is also an object of this invention to provide a flat wire spring which is set in a general longitudinal curve but which has only certain portions thereof curved, the remainder of the portions of the spring being flat.

These and other objects will be apparent from the drawing and the following description thereof. Referring to the drawing which is for illustrative purposes only, Fig. 1 is a plan view of the spring of this invention which has been shown in extended or flattened out position;

More particularly describing the invention, the flat spring comprises a wire 11 which has been undulated or bent into a sinuous shape to form alternately disposed diagonal portions 12 and U-shaped portions 13. The U-shaped portions 13 alternately face to opposite sides of the spring.

Figure 2:
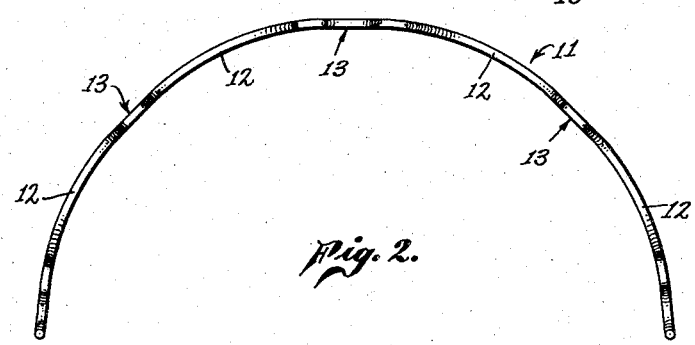
Fig. 2 is a side elevation of the spring when unsecured.
Figure 3:
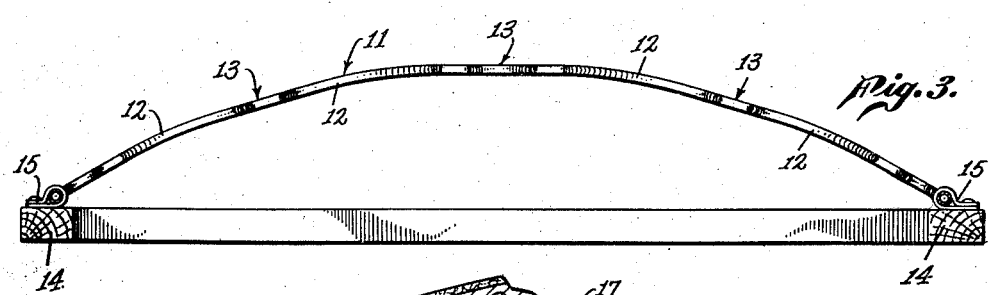
Fig. 3 is a side elevation of the spring of Fig. 2 shown secured in position in a frame-work which is partly shown in section.
Figure 4:
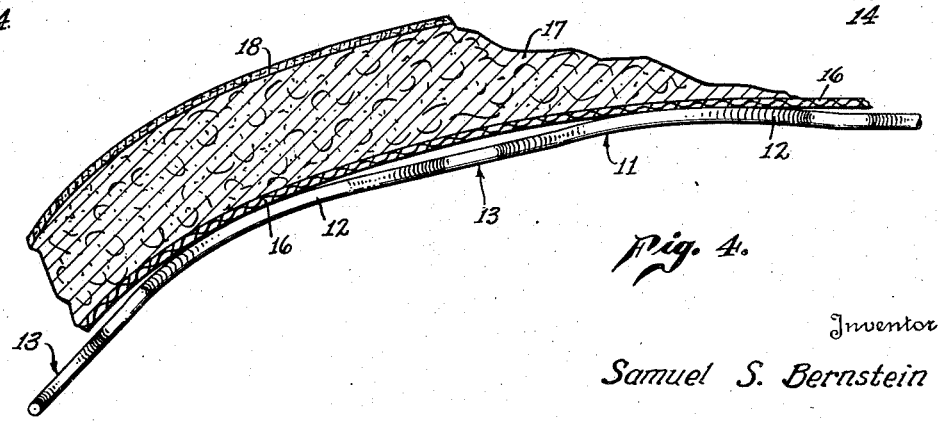
Fig. 4 is a fragmentary enlarged side elevation of one end of the spring of Fig. 3 shown in conjunction with a fragmentary section of upholstery.

A particular feature of this invention is the provision of diagonal portions 12 which are longitudinally curved as shown in Fig. 4. The U-shaped portions 13 are designed to be flat, that is, each entire U-shaped portion lies in a single plane when the spring is unsecured as in Fig. 2. There is, of course, a slight distortion of the U-shaped portions when the spring is expanded to the position of Fig. 3. This construction provides a spring which when unsecured takes the position in which it is shown in Fig. 2, namely, the spring describes a general longitudinal curve forming a semi-circle.

It should be particularly noted, however, that although the entire spring may appear to describe a general longitudinal curve, in reality it is only the diagonal portions 12 which are curved, and each of the U-shaped portions 13 are flat.

The spring is designed to be secured in place in a frame, such as 14, by spreading the ends of the spring to fit into the securing eyes 15. When thus secured in position in a frame, the spring is particularly effective to yieldably resist the forces brought against it and if distorted or bent beyond the plane of support, as the spring is increasingly bent beyond the plane of support, it becomes increasingly stiff and will readily spring back to its original position when the force acting upon it is removed.

In Fig. 4 a side elevation of a fragment of the spring is shown as it would appear when associated with upholstery material. The material shown comprises a bottom piece 16 of burlap, or the like, a filler or padding 17, and a fabric cover 18. In securing the upholstery material adjacent the spring, the material is pulled taut over the spring and secured in place. When pulled taut the bottom piece 16 only engages the curved portions 12 of the spring thereby leaving the U-shaped portions 13 out of engagement with the piece 16 and free to expand and contract to give flexibility to the spring. After the upholstery has been used for some time the piece 16 may lightly engage the portions 13 of the spring but the curved portions 12 support the major portion of the load. With this construction there is provided a spring which has less tendency to pinch the upholstery than the ordinary flat spring comprised of lateral U-shaped undulations. It should be noted that a greater amount of padding may be used in connection with the spring of this invention than is possible with the ordinary type of spring which is formed of a series of lateral U-shaped undulations, it having been pointed out above that a thick layer of filler or padding cannot be used in connection with the ordinary type spring.

Figure 1:
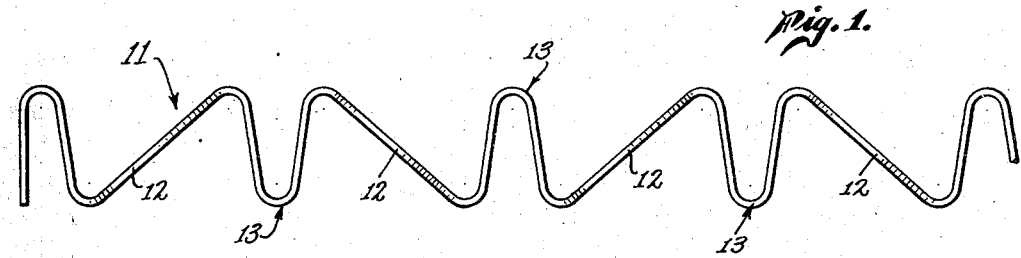

It should be apparent by referring to Fig. 1 that the spring of this invention requires less material than the ordinary type of flat wire spring which is formed of a series of alternately oppositely facing U-shaped undulations and that, therefore, the spring may be constructed more cheaply than the ordinary type of spring.

While the spring has been particularly shown and described it is within the scope of this invention to vary the shape of the undulations to some extent without departing from the invention and it is intended to cover such variations as come within the scope of the claims.

I claim as my invention:

1. A spring of the type described comprising a wire having lateral undulations forming alternate U-shaped portions and diagonal connecting portions, said U-shaped portions each extending the width of the spring.

2. A spring of the type described comprising a wire having lateral undulations forming alternate U-shaped portions and diagonal connecting portions, said U-shaped portions each extending the width of the spring, said diagonal connecting portions having a longitudinal curvature.

3. A spring of the type described comprising a wire having lateral undulations forming alternate U-shaped portions and diagonal connecting portions, said diagonal connecting portions having a longitudinal curvature, said U-shaped portions being flat.

SAMUEL S. BERNSTEIN.